United States Patent [19]
Bielfeldt et al.

[11] Patent Number: 4,574,001
[45] Date of Patent: Mar. 4, 1986

[54] PROCESS FOR PRODUCING FINELY DIVIDED DISPERSIONS OF METAL OXIDES IN ALUMINUM HYDROXIDE

[75] Inventors: Klaus Bielfeldt, Konigswinter; Dieter J. Braun, Kriegsdorf, both of Fed. Rep. of Germany

[73] Assignee: Vereinigte Aluminiumwerke Aktiengesellschaft, Fed. Rep. of Germany

[21] Appl. No.: 587,259

[22] Filed: Mar. 7, 1984

[30] Foreign Application Priority Data

Mar. 7, 1983 [DE] Fed. Rep. of Germany ....... 3308008

[51] Int. Cl.$^4$ .............................................. B01D 9/02
[52] U.S. Cl. .................................. 23/301; 23/305 A; 423/127; 423/629; 106/308 B
[58] Field of Search .............. 106/308 B; 23/296, 301, 23/305 A; 427/215; 423/121, 122, 127, 625, 629

[56] References Cited

U.S. PATENT DOCUMENTS

| | | | |
|---|---|---|---|
| 2,549,549 | 4/1951 | Wall | 23/305 A |
| 3,838,980 | 10/1974 | Gnyra | 23/301 R |
| 3,901,676 | 8/1975 | Heinze et al. | 65/33 |
| 4,291,010 | 9/1981 | Senda et al. | 423/594 |
| 4,447,270 | 5/1984 | Howard et al. | 106/308 B |
| 4,512,959 | 4/1985 | Pohland et al. | 23/305 A |
| 4,530,699 | 7/1985 | Schlesinger et al. | 23/305 A |

OTHER PUBLICATIONS

Fisher et al., "The Eutectic and Liquidus in the Al$_2$O$_3$—ZrO$_2$ System" *Journal of Materials Science* 16 (1981), 3447–3451.

*Primary Examiner*—David L. Lacey
*Attorney, Agent, or Firm*—Darby & Darby

[57] ABSTRACT

Disclosed is a process for producing finely divided dispersions of metal oxides and/or metal hydroxides. A supersaturated sodium aluminate liquor containing dissolved aluminum hydroxide is seeded with particles of at least one metal oxide and/or metal hydroxide. The liquor is subjected to predetermined crystallization conditions to form a crystallized solid. The crystallized solid is then separated from the liquor and dried.

8 Claims, No Drawings

PROCESS FOR PRODUCING FINELY DIVIDED DISPERSIONS OF METAL OXIDES IN ALUMINUM HYDROXIDE

FIELD OF THE INVENTION

The present invention relates to a process for the production of finely divided dispersions of metal oxides and/or hydroxides in aluminum hydroxide.

BACKGROUND OF THE INVENTION

Typically, finely divided dispersions of metal oxides and/or hydroxides are obtained by e.g., joint precipitation of hydroxides and calcination of the precipitates obtained. Such methods have been described in Tonindustrie Zeitung 94 (1970) No. 2, p. 45 ff., and Journal of Materials Science 16 (1981), pp. 3447-3451. Using these methods it is possible to obtain finely divided dispersions of the respective materials. However, such methods are very expensive, since it is necessary first to separately prepare solutions of salts of the respective metals, including aluminum. Additional problems arise from the fact that individual components do not precipitate at the same pH value and thus insufficient mixing of the components may result.

A further disadvantage of the known processes is the accumulation of a large quantity of salts in the neutralization process. The salts are required to effect the precipitation of hydroxides. These salts are retained in the precipitation and can be recovered only by meticulous washing (see U.S. Pat. No. 3,586,653).

Another method of preparing hydroxide dispersions is the "sol-gel" technique, used e.g. with the elements uranium, zirconium, thorium, magnesium, zinc, nickel, aluminum, and titanium (Am. Ceramic Soc. Bull. 51 (1972), pp. 158-161). The particle size in the sol is very small and the solids content usually very low. Dried product can be obtained only after removing a large quantity of water at a high cost. Moreover, the dried product has a very low bulk density.

Another method for preparation of mutual dispersions of different oxides is the hydrolysis of organometallic compounds, known for mixtures of zirconium, titanium, and aluminum oxides. This process is described in Journal Am. Ceramic Soc. 50 (1967), pp. 532-537.

One objective of the present invention is to prepare finely divided homogeneous dispersions of metal oxides and/or hydroxides having an aluminum hydroxide coating with a low water content, i.e. with high solids concentration in the filter cake, by means of a simple and environmentally acceptable process.

SUMMARY OF THE INVENTION

The process according to the present invention is used to produce finely divided dispersions of metal oxides and/or metal hydroxides. The metal oxide and/or hydroxide to be dispersed is introduced as seed into a supersaturated sodium aluminate ($AlNaO_2$) liquor containing dissolved aluminum hydroxide. The efficacy of the process becomes particularly high if seeding is carried out jointly with aluminum hydroxide seed. It is especially advantageous to seed with aluminum hydroxide after seeding with the metal oxide has been terminated. The liquor is subjected to predetermined crystallization conditions to form a crystallized solid. The solid is then separated from the liquor and dried.

DETAILED DESCRIPTION OF THE INVENTION

High yields at short crystallization times can be obtained if the metal oxide seed has an average diameter of less than 5 microns. The proper seed size is attained by grinding larger particles. Grinding results in the formation of "activated" crystal surfaces. These surfaces become available for seeding and thus accelerate the crystallization process. This effect is amplified further still if the aluminum hydroxide employed as additional seed has an average crystal size of less than 3 microns.

In principle, all metal oxides and hydroxides may be used as seed materials, as long as they are not soluble in sodium aluminate liquor at room temperature. For the production of cutting ceramic materials, however, the employment of oxides of metals from the third or fourth sub-group of the Periodic Table of elements is especially advantageous.

When preparing dispersions produced according to the present invention for use as cutting ceramic materials with high stability against thermal shock, it is advantageous to use zirconia ($ZrO_2$) as the metal oxide, especially partially stabilized zirconia. However, oxides of the metals magnesium, cobalt, nickel, zinc, chromium, iron, thorium or oxides or the rare earth metals may be used as well.

The invention is explained in more detail by the following examples which are not intended to limit the invention.

EXAMPLE 1

Sodium aluminate liquor obtained by the well-known Bayer process (see Encyclopedia Brittannica, 16th Ed., Macropedia Vol. I, p 642) for the production of alumina (140 g $Na_2O$ caustic/l having a molar ratio $Na_2O$:$Al_2O_3$ of 1.6) was stirred into three separate glass vessels equipped with thermostats and seeded with $ZrO_2$ ($d_{50}$=6.3 um ($d_{50}$=mean diameter, um=micrometer). The concentration of seed introduced was 2, 10, and 20 g/l (grams/liter), respectively. During the crystallization period samples were taken at 1, 6, 24, 48, 72, and 96 hrs. respectively.

Temperature was maintained at 40° C. After 24 hours all $ZrO_2$ particles were coated with $Al(OH)_3$, as shown by scanning electron micrographs. In table 1, the duration of crystallization of $ZrO_2$ and percentage yield of the aluminum hydroxide from the sodium aluminate liquor are shown.

It can be seen from Example 1 that by varying quantities of seed and periods of crystallization, the percentage of $ZrO_2$ in the product may also be varied within a wide range. At a seed concentration of 2 g/l $ZrO_2$, approximating 1.4% of $Al(OH)_3$ present in the liquor, the process efficiency is very low with a yield of only 13.3% for a crystallization period of 72 hours. Therefore, it is not advisable to use low seed concentrations. Ideally, the period of crystallization should lie between 24 and 72 hours. For periods of less than 24 hours, crystallization takes place but the yield is very low. For periods of more than 72 hours, even at seeding concentrations of 10 to 50 g/l, the crystallization proceeds very slowly. Higher seeding concentrations have been shown to be counterproductive, since not every zirconia particle becomes coated with aluminum hydroxide and thus separation of $ZrO_2$ particles from the aluminum hydroxide is a potential problem.

EXAMPLE 2

The procedure of Example 1 was repeated, except that zirconia was ground to $d_{50}=1.2$ μm immediately (less than 24 hours, preferably less than 1 hour) before it was employed as seed. It may be seen from Table 2 that the finer seed obtains higher yields of Al(OH)$_3$ in addition to forming a more homogeneous distribution of zirconia in the solid phase.

Table 2 shows the results obtained with the finer grain size as well as the mean particle diameter of the resulting ZrO$_2$/Al(OH)$_3$ particles.

TABLE 1

| PERIOD OF CRYSTALLIZATION HOURS | CONCENTRATION OF SEED ZrO$_2$ | TOTAL YIELD ZrO$_2$/Al(OH)$_3$ | % ZrO$_2$ IN PRODUCT | % SEED RELATIVE TO Al(OH)$_3$ IN LIQUOR | YIELD OF Al(OH)$_3$ |
|---|---|---|---|---|---|
| 24 | 2 g/l | 12.3 g/l | 16.2% | 1.4% | 4.7% |
| 48 | 2 g/l | 10.6 g/l | 9.7% | 1.4% | 8.4% |
| 72 | 2 g/l | 31.2 g/l | 6.4% | 1.4% | 13.3% |
| 1 | 10 g/l | 10.6 g/l | 94.3% | 6.9% | 0.3% |
| 6 | 10 g/l | 18.3 g/l | 54.6% | 6.9% | 3.8% |
| 24 | 10 g/l | 52.8 g/l | 18.9% | 6.9% | 19.5% |
| 48 | 10 g/l | 63.5 g/l | 15.7% | 6.9% | 24.3% |
| 72 | 10 g/l | 83.4 g/l | 12.0% | 6.9% | 33.4% |
| 96 | 10 g/l | 86.9 g/l | 11.5% | 6.9% | 34.9% |
| 24 | 20 g/l | 65.9 g/l | 30.3% | 13.9% | 20.9 |
| 48 | 20 g/l | 75.8 g/l | 26.3% | 13.9% | 25.4% |
| 72 | 20 g/l | 97.2 g/l | 20.5% | 13.9% | 35.1% |
| 24 | 50 g/l | 97.2 g/l | 51.4% | 34.7% | 21.5% |
| 48 | 50 g/l | 106.7 g/l | 46.8% | 34.7% | 25.8% |
| 72 | 50 g/l | 129.2 g/l | 38.7% | 34.7% | 36.0% |

TABLE 2

| Period of Crystallization (Hours) | Concentration of Seed | Total Yield ZrO$_2$/Al(OH)$_3$ | % ZrO$_2$ in Product | $d_{50}$ of Prod. |
|---|---|---|---|---|
| 24 | 10 g/l | 91.9 g/l | 10.8% | 9 um |
| 48 | 10 g/l | 121.8 g/l | 8.2% | 10 um |
| 72 | 10 g/l | 131.1 g/l | 7.6% | 10 um |
| 24 | 20 g/l | 120.9 g/l | 16.5% | 5.7 um |
| 48 | 20 g/l | 133.9 g/l | 14.9% | 6.0 um |
| 72 | 20 g/l | 139.1 g/l | 14.4% | 6.4 um |

EXAMPLE 3

The procedure of Example 2 was repeated, except the seed included fine aluminum hydroxide in addition to ZrO$_2$ in order to further improve the total yield and to decrease the diameter of individual particles of the product. 1 g/l of very fine aluminum hydroxide seed ($d_{50}=1.2$ μm) was obtained with the ZrO$_2$ seed. The Al(OH)$_3$ was ground to grain size immediately before seeding in order to achieve maximum seeding activity. Crystallization on the Al(OH)$_3$ seed competes with crystallization on ZrO$_2$ particles and leads to formation of a thinner coating of Al(OH)$_3$ on the ZrO$_2$ grains. Table 3 shows the results of this experiment. Addition of the finely ground Al(OH)$_3$ to the zirconia seed increases yield and reduces mean particle diameter.

TABLE 3

| Period of Crystallization (Hours) | Concentration of Seed | Total Yield | % ZrO$_2$ in Prod. | $d_{50}$ of Prod. |
|---|---|---|---|---|
| 24 | 1 g/l Al(OH)$_3$ | 130.2 g/l | 15.4 | 2.6 um |
| | 20 g/l ZrO$_2$ | | | |
| 48 | 20 g/l ZrO$_2$ | 136.8 g/l | 14.6 | 2.5 um |
| 72 | 20 g/l ZrO$_2$ | 140.3 g/l | 14.3 | 2.4 um |

If seeding with Al(OH)$_3$ takes place within 24 to 48 hours after the liquor is seeded with ZrO$_2$, the Al(OH)$_3$ coating forms without interfering competition, and the results obtained lie between those given in examples 2 and 3.

What is claimed is:

1. A process for producing finely divided dispersions of metal oxide particles having a coating of aluminum hydroxide comprising:
    seeding a supersaturated sodium aluminate liquor containing dissolved aluminum hydroxide with seed particles of at least one metal oxide;
    subjecting the seeded liquor to predetermined crystallization conditions for from about 24 to about 72 hours to form crystallized solid metal oxide particles having an aluminum hydroxide coating;
    separating the crystallized solid particles from the liquor; and
    drying the crystallized solid particles obtained.

2. The process according to claim 1, wherein the seed particles added comprise 2 to 40% by weight of the aluminum hydroxide dissolved in the sodium aluminate liquor.

3. The process according to claim 2, additionally comprising seeding with aluminum hydroxide particles.

4. The process according to claim 3 wherein said seeding with aluminum hydroxide particles is initiated after the seeding with the metal oxide particles has been terminated.

5. The process according to claim 2 wherein the seed particles are ground to a mean diameter of less than 5 microns immediately before introduction to the liquor.

6. The process according to claim 3 wherein the mean diameter of the aluminum hydroxide particles is less than 3 microns.

7. The process according to claim 1 wherein the metal oxide is an oxide of a metal of the third or fourth subgroup of the Periodic System of the Elements.

8. The process according to claim 1 wherein the metal oxide is zirconium oxide.

* * * * *